Patented Nov. 4, 1947

2,430,006

UNITED STATES PATENT OFFICE 2,430,006

4-METHYL-5-IMIDAZOLONE-(2)-CAPROIC ACID AND ESTERS THEREOF

Robert Duschinsky, Essex Fells, N. J., assignor to Hoffmann-La Roche, Inc., Roche Park, Nutley, N. J., a corporation of New Jersey No Drawing. Original application April 29, 1944, Serial No. 533,396. Divided and this application March 20, 1946, Serial No. 655,883

4 Claims. (Cl. 260—309)

My invention relates to new imidazolone compounds of the general formula:

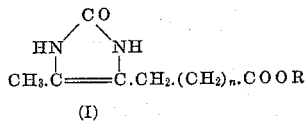

(I)

in which $n$ designates a low integer and R represents hydrogen or lower alkyl.

This application is a division of my copending application Serial No. 533,396, filed April 29, 1944 which has issued as Patent No. 2,397,250, March 26, 1946.

In general, the synthesis follows the course indicated below, wherein $n$ is a small integer and R is hydrogen or lower alkyl.

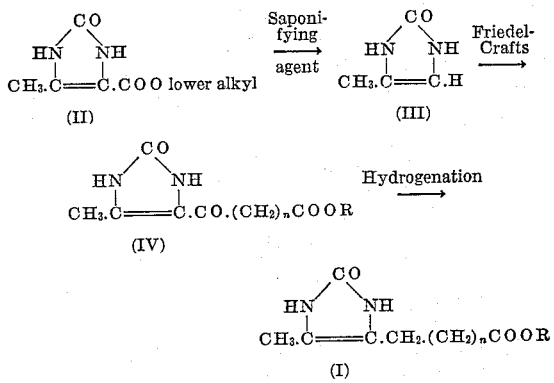

A typical example of a compound falling within my novel class of substances is one in which $n$ is 4 and R is the ethyl radical. A method for preparing this specific compound is given as follows.

*Example*

4-methyl-imidazolone-2 is prepared as follows:

34 g. 4-methyl-5-imidazolone-(2)-carboxylic acid ethyl ester were dissolved in 215 cc. 0.93 N NaOH (1 mole) and the solution kept 68 hours at 50–55°. After cooling is was neutralized to pH 7 by gradual addition of 37.5 cc. 5 N HCl, which was accompanied by much carbon dioxide evolution and crystallization of the reaction product. The mixture was stirred in an ice bath for 1 hour, the methylimidazolone filtered off and washed chlorine free with some ice cold water. After drying in an oven at 60°, a first crop of 6.6 g. was obtained. M. P. 184–192°.

The mother-liquor was concentrated in vacuo, while the pH, which had the tendency to increase was adjusted to 7 by gradual addition of 7 cc. N HCl, and was finally brought to dryness. The white residue was extracted 3 times with 35 cc. of boiling absolute ethanol, and once with 95 per cent ethanol. The alcoholic extracts, after separation from the undissolved sodium chloride, were concentrated to dryness, thus yielding a second crop of 8.55 g. methylimidazolone melting at about 178°. Total yield: 15.15 g. Sometimes the first crop of reaction product did not crystallize directly, but only after partial concentration of the solution in vacuo. The product is 4-methyl-imidazolone-2.

5.46 g. of the foregoing 4-methyl-imidazolone-2 were suspended in 50 cc. nitrobenzene. 11.1 g. (1.04 mole) of adipic acid ethyl ester chloride were added, and the mixture stirred well in a three-neck flask fitted with an airtight mechanical stirrer and ascending condenser. With cooling in an ice bath 15 g. (2 moles) anhydrous aluminum chloride were added, which readily went into solution, accompanied by heat evolution. Then, with continuous stirring, the temperature was raised to 60–65° and maintained there for 5 hours. At that time, the evolution of HCl had completely stopped.

The reaction mixture was a brown, viscous liquid. It was taken up with 50 g. crushed ice and 100 cc. ether, whereupon yellowish crystals separated which were washed chlorine and nitrobenzene-free with water and ether. After drying at 100° in vacuo, 7.67 g. of the reaction product were obtained. M. P. 170° (unsharp). By recrystallization in 75 cc. of 50 percent ethanol, with addition of norite, 6.73 g. yellowish crystals, M. P. 171.5–173°, were obtained.

The substance is soluble in alcohol and acetic acid, insoluble in water and ether. It gives only a very slight orange coloration with ferric chloride. The product is 4-methyl-5-imidazolone-(2)-ε-keto-caproic acid ethyl ester.

5.08 g. of this keto ester, dissolved in 50 cc. acetic acid, were hydrogenated at ordinary pressure with 2 g. prehydrogenated Adam's platinum catalyst. In 30 minutes 977 cc. hydrogen were taken up (theory: for two moles of hydrogen 975 cc. at 24°). The catalyst was filtered off, the solution concentrated in vacuo, the residue was taken up in alcohol, and then again concentrated. The crystalline residue was finally taken up in 10 cc. alcohol, and the mixture cooled in a dry ice bath. The white crystals were filtered, washed with cold ethanol and ether. Yield: 3.36 g. M. P. 194–196°. 100 mg. were recrystallized from 1.5 cc. ethanol and gave 70 mg. material of the same melting point. The substance is fairly soluble in alcohol and acetic acid, little soluble in ether.

This final product is 4-methyl-5-imidazolone-(2)-caproic acid ethyl ester. The ester may be hydrolyzed in the usual manner to the corresponding acid.

It will be understood in the descriptive portion of the specification and in the claims that the term imidazolone, as well as the structural representation will embrace all tautomeric forms.

I claim:

1. Compounds of the general formula:

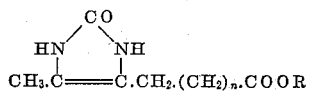

in which $n$ is a low integer and R is a member of the group consisting of hydrogen and lower alkyl.

2. Compound in accordance with claim 1 in which $n$ is 4.

3. The compound of claim 1 in which $n$ represents 4 and R represents ethyl.

4. Compound in accordance with claim 1 in which R represents lower alkyl.

ROBERT DUSCHINSKY.